United States Patent [19]

Devolle

[11] 3,957,142

[45] May 18, 1976

[54] ELECTRICALLY INSULATED POWER LINE FOR SUPPLYING ELECTRICAL ENERGY TO MOBILE DEVICES

[75] Inventor: Guy Eugene Gaston Devolle, Arcueil, France

[73] Assignee: S. A. Chadefaud, Val de Marne, France

[22] Filed: Mar. 10, 1975

[21] Appl. No.: 557,172

[30] Foreign Application Priority Data

Mar. 11, 1974 France .............................. 74.08190

[52] U.S. Cl. ............................ 191/23 A; 174/99 E; 174/133 B; 191/22 R; 191/22 DM; 191/29 DM; 191/30; 191/32

[51] Int. Cl.² ............................................ B60M 1/34

[58] Field of Search ................ 174/86, 99 E, 129 R, 174/129 B, 133 R, 133 B; 191/22 R, 23 R, 25, 28–33 R, 35, 39, 40, 23 A, 22 DM, 29 DM, 33 DM

[56] References Cited

UNITED STATES PATENTS

| | | | |
|---|---|---|---|
| 2,824,912 | 2/1958 | Taylor................................... | 191/35 |
| 2,991,336 | 7/1961 | Shaw et al. ........................ | 191/30 X |
| 3,311,715 | 3/1967 | Corl et al........................... | 191/30 X |
| 3,399,281 | 8/1968 | Corl.................................. | 191/23 R |

*Primary Examiner*—Stephen G. Kunin
*Attorney, Agent, or Firm*—Browdy and Neimark

[57] ABSTRACT

The power line comprises a conducting section enclosed in an electrically insulating casing open on one side. The section and the casing are hung by claws. At least one claw is designed to block the conducting section and the casing. Expansion joints are designed at some intervals, and end elements prevent any access to the conducting section which is electrically supplied by junction units included in the end elements connecting two adjacent segments.

16 Claims, 16 Drawing Figures

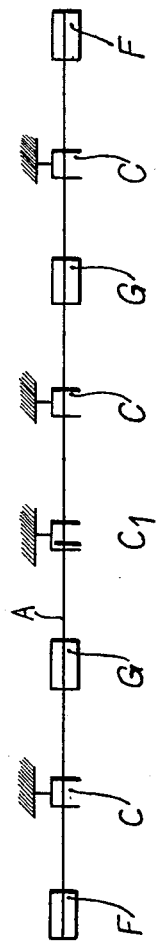
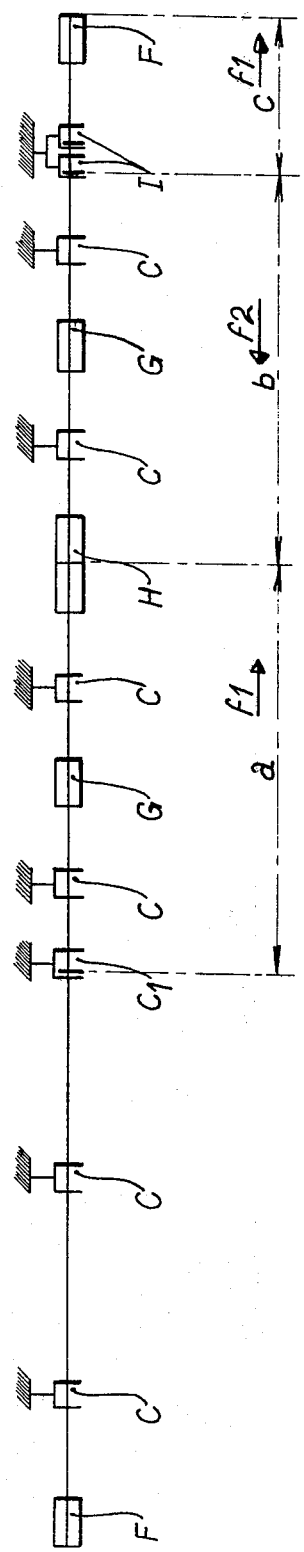

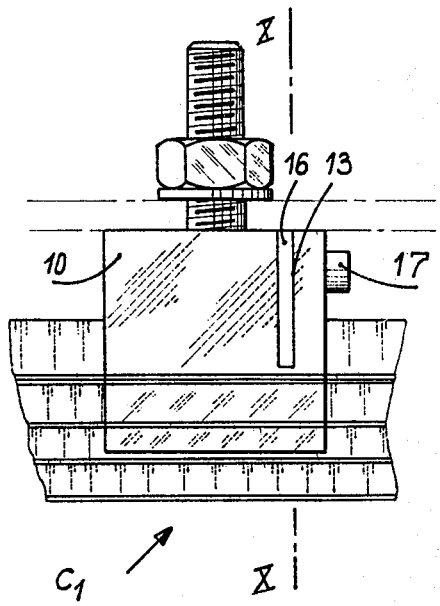
Fig.9.
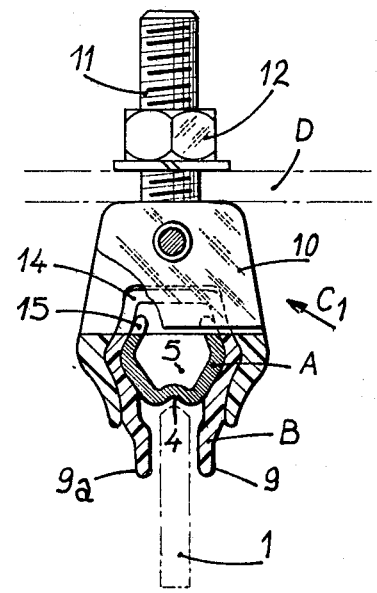
Fig.10.
Fig.16.
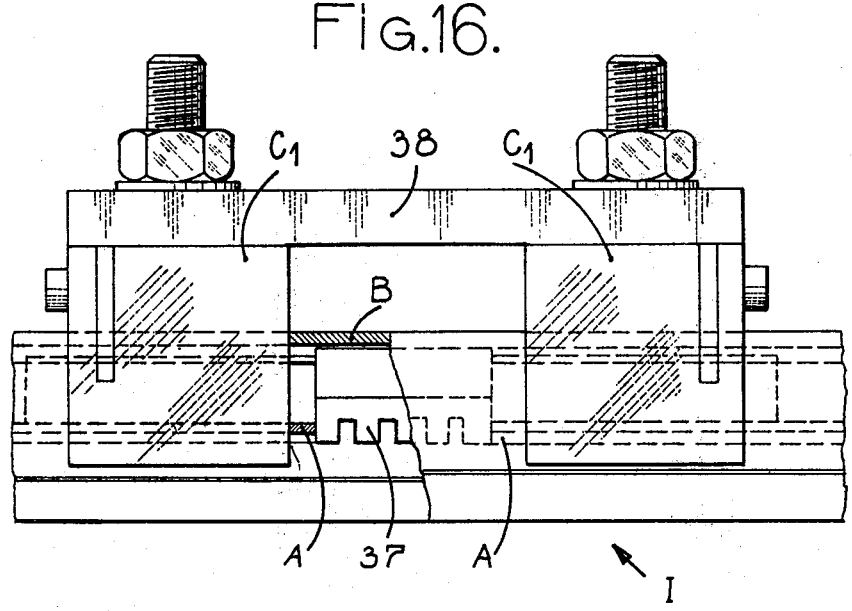

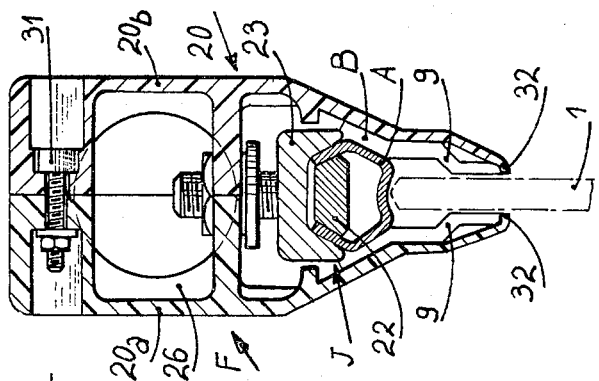
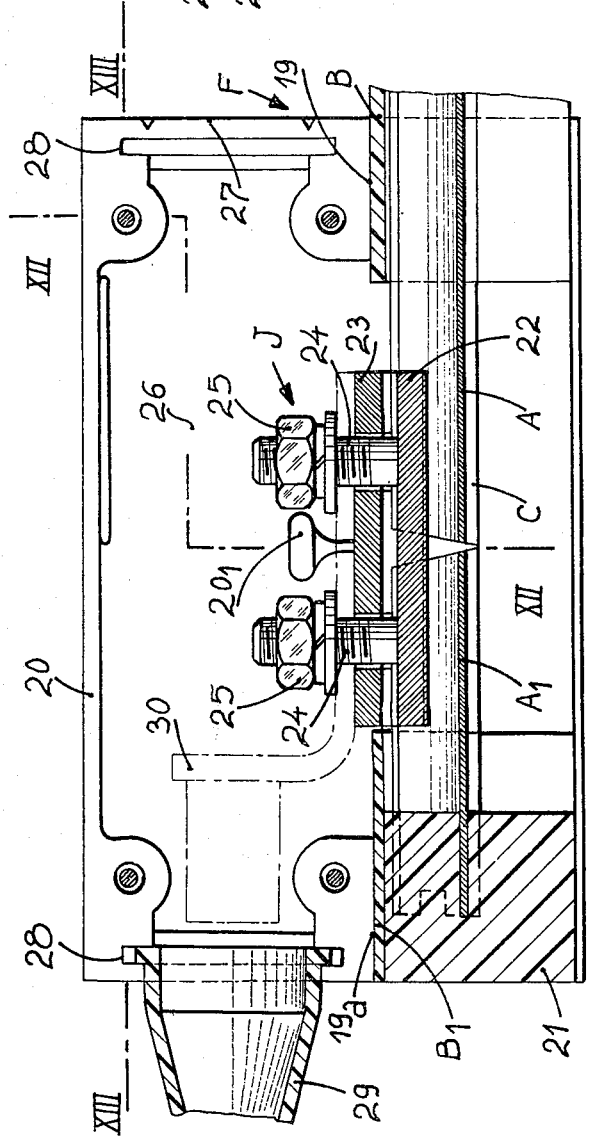
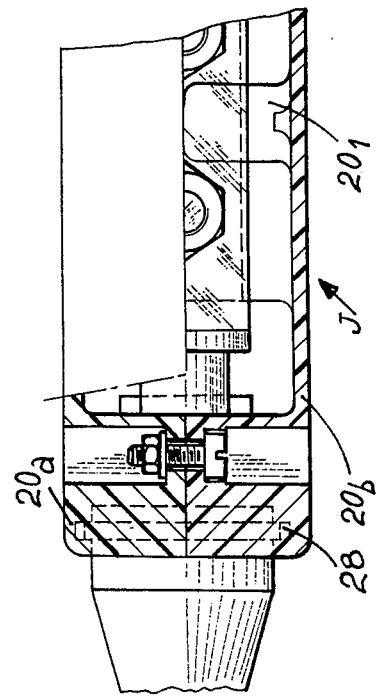
Fig.12.
Fig.11.
Fig.13.

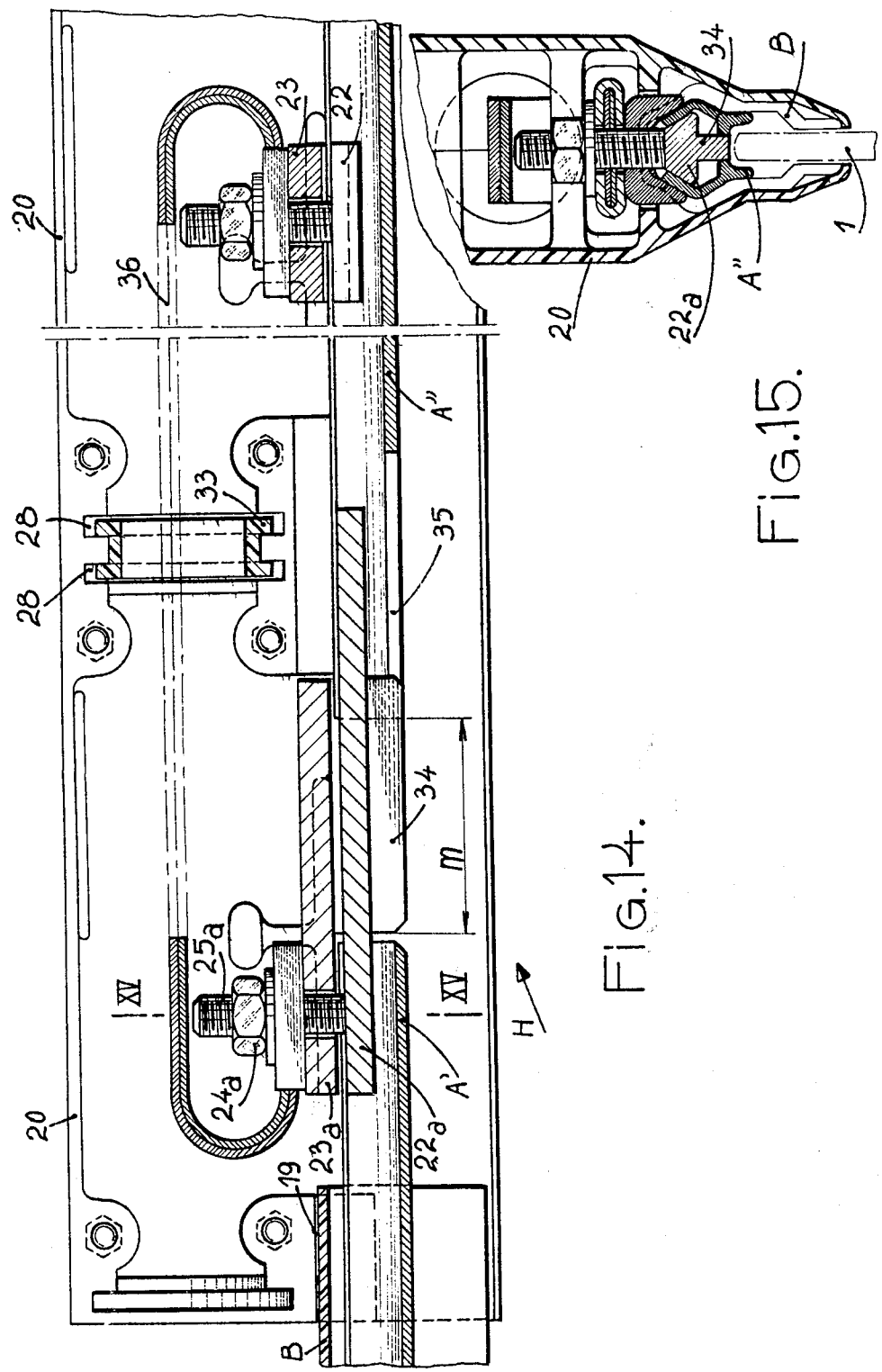

ELECTRICALLY INSULATED POWER LINE FOR SUPPLYING ELECTRICAL ENERGY TO MOBILE DEVICES

The present invention relates to an electrically insulated power line for supplying electrical energy to mobile devices.

Such lines are especially used for supplying power to electric motors, travelling cranes, trolleys, mobile winches, waggons, and movable machine-tools.

Known lines of this type use conducting metal sections with a circular cross-section or a substantially 8-shaped cross-section, said metal sections being placed in an electrically insulating casing of a U-shape, with arms of the U substantially protruding beneath the conducting metal sections to prevent occurrence of accidents.

Since the conducting metal sections have necessarily a length relatively small to be easily handled and stored, the prior art has taught the use of pins or claws to connect said conducting metal sections, said pins being engaged to snug fit into said conducting metal sections or said claws pressing laterally two portions of adjacent conductors on a part of their height.

Several disadvantages result from the known arrangements. The circular or 8-like shape of the conducting metal sections does not enable a correct guiding of the mobile friction piece or brush which has to run on the line to supply electrical energy to mobile devices. The mobile piece, consequently, bears on the inner edges of the U-shaped insulating casing which partly covers the conducting metal section, which frequently causes damage to the casing.

Moreover, the connection through the use of pins between two adjacent portions does not ensure a good permanent electric contact. Besides, when the lines are long, heat expansion joints must be designed and, up to now, it has only been possible to separate by some distance two adjacent portions of conducting metal sections, there exists thus a solution of continuity or gap in the supply of the friction piece running on the line.

The present invention copes with the above mentioned disadvantages by creating a new and extremely simple line of which all the elements can be easily standardized, and this while using conducting metal sections especially adapted to the amount of current to be carried by the line.

According to this invention, the lines comprises segments of conducting sections having, in cross-section, substantially a shape of an hexagon with a concave side directed downwards to form a contact and guiding surface for a friction piece. Said segments of conducting sections are placed in an electrically insulating casing in which they are entirely encased except on the concave side on each side of which said casing forms a deep passage for the friction piece. Said conducting sections are connected together by means of connection units comprising a cap forming section encasing the segments of the conducting sections on the sides thereof opposite to the concave side, tightening meanns being designed to block together said conducting sections and said connection unit being contained inside a removable housing provided to encase ends of the electrically insulating casings surrounding the segments of conducting sections which are hung by means of hanging claws comprising a body made of insulating material encasing the insulating casing.

Various other features of the invention are moreover shown in the following detailed description.

Embodiments of the invention are shown by way of a nonrestrictive example in the accompanying drawings.

FIG. 1 is a diagrammatic view of a short portion of a power line according to the invention.

FIG. 2 is a diagrammatic view of a great length portion of a power line according to the invention.

FIG. 9 is an elevation view of an element of the line.

FIG. 10 is a cross-section substantially taken along line X—X of FIG. 9.

FIG. 11 is a longitudinal cross-section of another element of the invention.

FIG. 12 is a cross-sectional view taken along line XII—XII of FIG. 11.

FIG. 13 is a cross-sectional view substantially taken along line XIII—XIII of FIG. 11.

FIG. 14 is a longitudinal cross-sectional elevation view similar to that of FIG. 11 of still another element.

FIG. 15 is a cross-sectional view taken along line XV—XV of FIG. 14.

FIG. 16 is a partly cross-sectional elevation view showing a still further element of the line.

Figure 3:
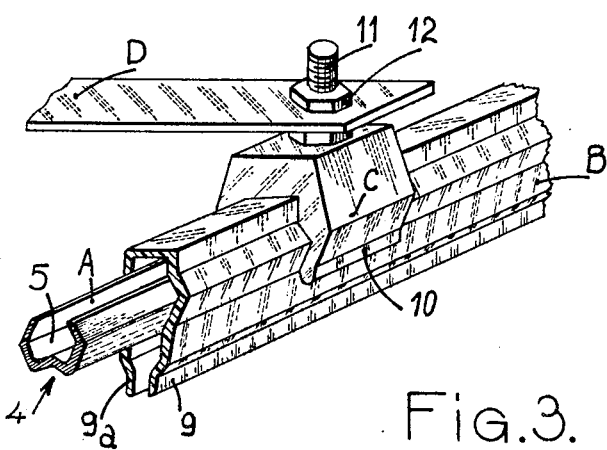
FIG. 3 is an enlarged perspective view of a part of the line.

As shown in FIG. 3, the power supplying line comprises conducting metal sections A, electrically insulated on their whole length by an insulating casing B supported at intervals by hanging claws C wich are supported by iron fittings such as D.

Figure 4:
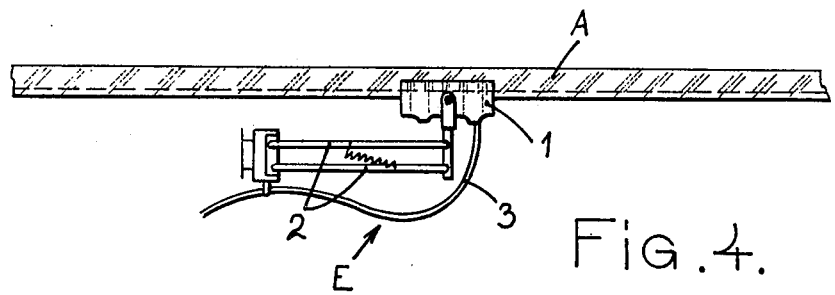
FIG. 4 is a diagrammatic elevation view of a current collector adapted to the line.
Figure 5:
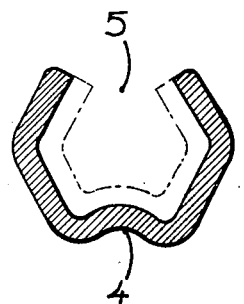
FIGS. 5–8 are transverse cross-sections showing different variants of embodiments of the conducting element of the line of the preceding figures.

FIG. 4 shows that the supply of the current from the conducting metal section A is made by a captor generally designated by E and comprising a friction piece or brush 1 placed on a hinged parallelogram or pantograph 2. A conductor 3 connects the brush or friction piece 1 to the receiving device.

The conducting metal sections A are necessarily of relatively small length, for example a few meters, to be easily transported and stored. Said successive metal sections have to be electrically connected together or, on the contrary, isolated. It is essential also that they can freely expand upon temperature changes.

In case of a short portion of line, as shown in FIG. 1, a single conductor can eventually be used. For example, at its median portion, the conductor is hung by a claw $C_1$, which will be called an immobilization claw, from which the conductor and its casing B can freely expand while sliding in the hanging claws C of FIG. 3. At its two ends, the line is provided with end parts F as described below. The supply in electrical current is ensured either from the end parts F or from junction elements G, as described below, which are also used to connect two successive portions of conducting sections.

When the line has a great length and as shown in FIG. 2, besides the above described components having the same references as above, an immobilization claw $C_1$ is designed between two long portions which can each comprise various conducting segments connected by junction elements G; the support being as previously ensured by hanging claws C. An end part F is designed at both ends of the line and, besides, said line is provided with expansion elements H as described below. When parts of the line has to be electrically insulated, insulation elements I are also designed.

As shown in FIG. 2, the immobilization claw $C_1$ constitutes a stop element for the line and the portion of line $a$ can expand in direction of the arrow $f_1$. The portion of line $b$ can also expand in direction of arrow $f_2$ if it is maintained by the insulating element I when said element is placed as an immobilization element, and the last portion of line $c$ can then expand in same direction as the arrow $f_1$.

As in the case of FIG. 1, the line is supported at intervals by the hanging claws C.

As now shown in FIGS. 3 and 5–8, the conducting section A has the approximate shape of an hexagon, which gives to the conducting section substantially similar inertia moduli both along its horizontal axis and along its vertical axis.

The lower part 4 of the section is shaped in a concave way to constitute a guide above the friction piece 1 which is shaped in a complementary mated way. The over-all sizes of the sections are, in all cases, always the same; only the wall thickness is different depending on the electrical power to be supplied. The simplest shape of the section is that shown in FIG. 5, said section being hollow and open at its upper portion as shown at 5.

Figure 6:
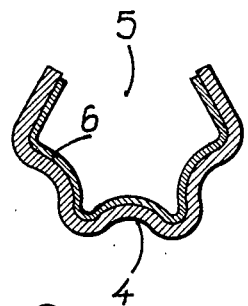
Figure 7:
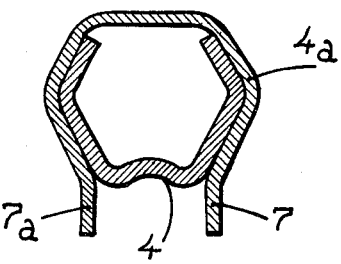

If desired, the section can be bi-metallic and comprise in FIG. 6 an insidely provided web 6 made of steel or, on the contrary, in FIG. 7 an outsidely provided envelope 4a made of steel and advantageously forming flanged edges 7, 7a still improving guiding of the friction piece 1.

Figure 8:
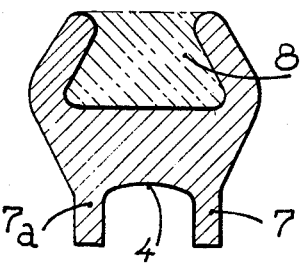

When a very important electric power must be supplied, the section can be solid for a large portion thereof, as shown in FIG. 8, and comprises flanged edges 7, 7a which increase its passage cross-section. As a limit, the section can be solid as illustrated in mixed lines at 8.

As particularly shown in FIG. 3, the successive portions of the conducting sections A are covered on their whole length by the insulating casing B which is constituted by an extruded section made of synthetic resin or rubber, insidely shaped to take the shape of and engage the lateral edges of the section A and wrap the same on its top. The lateral sides of the casing B form flanged edges 9, 9a coverging towards each other and leaving a free interval which is just sufficient to let free therebetween a passage for the friction piece 1.

FIG. 3 shows that the hanging claws C comprise a body 10, made of synthetic material or moulded rubber, which is shaped to take the shape of the outer wall of the casing B. The body 10 of the claws C exerts a small resilient pressure on the casing. Thus in case said casing is destroyed, for example in case of melting, the conducting section 4 is still held (by the claw C) and electrically insulated. Besides, the body 10 forms a double electrical insulation between the conducting section 4 and the iron fittings D to which the body is fixed by means of a threaded rod 11 on which is screwed a nut 12.

The immobilization claws $C_1$ are constituted, as shown in FIGS. 9 and 10, in a similar way as the hanging claws C but their body 10 is provided with a groove 13 which corresponds to a tap 14 made in the top of the casing B and to a tap 15 made in the top of the conducting section A.

A small plate 16 made of electrically insulating material 16 is placed in the groove 13 and in the taps 14 and 15 to lock the body 10 with the casing B and the conducting section A. A screw 17 blocks the small plate 16. It is noted that by this means, both the casing B and as the section A cannot slide with respect to the immobilization claw $C_1$; while, on the contrary, said section and said casing can slide inside the hanging claws C.

The end parts F are shown in FIGS. 11–13 which show the end of the segment $c$ of the section A and also the end of the casing B covering it but not extending entirely up to its end. Said casing B is placed in a passage 19 of a housing 20 constituted by two half-shells 20a-20b. The housing 20 is symmetrical with respect to its vertical median axis and consequently delimits a second passage 19a in which is placed a small portion of casing $B_1$, which surrounds a stud made of electrically insulating material 21 embeding the end of a segment of conducting sections $A_1$.

The segment $A_1$ of conducting section is connected to the end of the section A by a connection unit J. The connection unit J, which is provided also in other elements described below, comprises a bar or section 22 taking the shape of the inner wall of the two upper converging sides of the sections A and $A_1$. The unit J comprises a second section or cover 23 which encovers the sections A and $A_1$ in taking the shape of the outer wall of the upper sides. Screws and nuts 24, 25 urge the section 23 towards the section 22 and consequently, pinch the corresponding portions of the conducting sections A and $A_1$ to constitute a retaining rib.

The above disclosure shows that the insulating block 21 cannot be extracted from the housing 20 and prevents any access to the conducting sections A and $A_1$.

FIG. 13 shows that housing 20 advantageously delimits an abutment $20_1$ between the two nuts 25 to limit the motion amplitude of the conducting sections A, $A_1$ and the portions of casing B, $B_1$. The drawing further shows that the housing 20 delimits, above the connection unit J, a housing 25 of a relatively important size and which is closed, at its ends, by breaking caps 27 covering grooves 28. Thus, the housing 20 can be used to place one or two end parts 29 enabling passage of a current supplying conductor connected to at least one of the screws 24 by a stud 30.

The screws 24 can, with no difference, protrude from the section 2, as represented, or be screwed therein. When the conducting section A is solid as is the case of FIG. 8, then the screws 2 are directly screwed in threadings formed in the section A of FIG. 8.

For easily positioning the housing 20, the same is constituted as previously explained of two half-shells connected together by any appropriate means, such as screws 31 and nuts, or claws and, as shown in FIG. 12, the base of the two half-shells of the housing completely encases the casing B and forms flanges 32 coming beneath said casing B, whereby said housing 20 constitutes an additional protective element in case of an accident occuring to the casing B.

To constitute the junction elements G mentioned in reference to FIGS. 1 and 2, there is used exactly the same housing as previously described and the same connection unit J forming a retaining rib. But the portion of conducting section $A_1$ is then constituted by the end of another portion of conducting section A and the insulating block 21 of course is cancelled. Then the connection unit can or cannot be utilized to ensure a supply in electric current.

FIG. 14 shows how are made the heat expansion joints H. There are used two housings 20 placed end to end and which are connected by a junction ring 33, for example made of rubber, engaged in the grooves 28 of said two housings 20.

A section 22a is placed as in the case of FIG. 11 to extend from one to the other of the two segments of conducting sections A', A'' separated from each other of a distance m greater than the linear heat expansion to which the two segments of sections may be submitted.

A small tongue 34 made of conducting material is fixed under the section or bar 22a on a part of the length thereof to come in close vicinity with the conducting section A' and to be engaged into a slot 35 designed at the end of the conducting section A''. FIG. 15 shows that the small tongue 34 is shaped on its bottom to correspond to the normal shape of this section to enable the friction piece 1 to bear both against said section and against said small tongue.

The section 22a is held in place by a section cap 23a similar to the above described one and tightened by means of a screw and nut arrangement 24–25a. Thus the section 22a is fixed to the conducting section A' and is engaged in the conducting section A'' in which it can slide at the same time as tongue 34.

A second connection unit with sections 22, 23 forming a retaining rib is fixed onto the conducting section A'' in the second housing 20, and a conducting braid 36 ensures the connection as represented.

There is provided that the connection unit of the section 22a with the section 23a be in abutment inside the first housing 20, while the second connection unit with connection sections 22–23 is not in abutment. Thus, the housings 20 are rigidly connected to the conducting section A' and move at the same time as said conducting section heat-expands or contracts. On the contrary, the section A'' slides inside the second housing 20 along the small tongue 34, which improves the guiding and which prevents a solution of continuity to exist for the friction piece 1.

FIG. 16 shows how to carry out the invention when two portions of conducting section A have to be electrically insulated from each other. In that case the insulating element I comprises an insulating block 37 of a same cross-section shape as that of the conducting sections A, and which is inserted between the two segments of conducting section A inside the casing B; and two immobilization claws $C_1$ similar to that described in reference to FIGS. 9 and 10 are placed and connected by a bar 38. The immobilization claws $C_1$ of the element I can or cannot at will be used to hang the conducting sections A and their casing B, and prevent besides any relative motion of the two segments of conducting section A.

The invention is not restricted to the embodiments shown and described in detail, for various modifications thereof can moreover be applied thereto without departing from the scope of the invention as shown in the appendant claims. Especially, since the conductive section A has in cross-section substantially the shape of an hexagon, the conducting section A can be bent with a relative facility, and the casing B is advantageously made of a material sufficiently soft to bent by itself when engaged to cover the conducting section. Also when the conducting section is hollow, it can be insidely provided with a heating cable thus preventing any risk of frost when the supply line is outside or in cold and wet premises.

I claim:

1. An insulated power line for supplying electrical energy to mobile devices, comprising segments of conducting sections having in cross-section, substantially a shape of an hexagon with a concave side directed downwards to form a contact and guiding surface for a friction piece, said segments of conducting sections being placed in an electrically insulating casing in which they are entirely encased, except on the concave side, on each side of which said casing forms a deep passage for the friction piece, said conducting segments being connected together by means of connection units comprising a cap forming section encasing the segments of the conducting sections on the sides thereof opposite to the concave side, tightening means being designed to block together said conducting sections and said connection unit being contained inside a removable housing provided to encase ends of the electrically insulating casings surrounding the segments of conducting sections which are hung by means of hanging claws comprising a body made of insulating material encasing the insulating casing.

2. The insulated power line as set forth in claim 1, wherein some of the hanging claws have a slot in their body for introduction of a locking plate passing in cuts transversely designed in the conducting section and the casing encasing it, whereby said hanging claws form also longitudinally locking elements.

3. The insulated power line as set forth in claim 1, wherein the segments of conducting sections all have the same outer sizes, but different wall thicknesses.

4. The insulated power line as set forth in claim 1, wherein the segments of conducting sections are plurimetallic with metal of various strengths, the strongest metal being placed inside the sections.

5. The insulated power line as set forth in claim 1, wherein the segments of conducting sections are plurimetallic with metal of various strengths, the strongest metal being outsidely placed and including lateral guides on each side of the concave side guiding the friction piece.

6. The insulated power line as set forth in claim 1, wherein the connection units comprise a first conducting section engaged inside two segments to be connected together and shaped, in cross-section, in a complementary way to said conducting sections, and a second section partly encasing the ends of said two segments, and screws and nuts being provided to tighten together the two conducting sections.

7. The insulated power line as set forth in claim 1, wherein the connection units form further re-supplying means, a stud being tightened on the second section outsidely encasing the segments to be connected.

8. The insulated power line as set forth in claim 1, wherein the housing containing the connection unit is made of electrically insulating material and is shaped to completely encase the insulating casing including delimiting flanges bearing beneath said casing which is held in passages delimited at two ends of the housing which forms a housing above the connection unit of the two segments, breaking caps being besides provided in the end sides of the housing, and blocking notches for further elements being formed behind said breaking caps.

9. The insulated power line as set forth in claim 1, wherein the housing delimits abutments to prevent motion of the connection unit of the two segments of conducting sections connected together.

10. The insulated power line as set forth in claim 1, wherein the housing is formed by two self-assembling half-shells.

11. The insulated power line as set forth in claim 1, further including expansion joints comprising two housings placed end to end and connected by a ring-like junction element, said housings being used to contain a junction conducting braid connected by connection units to the two ends, separated from each other, by two segments of conducting sections.

12. The insulated line as set forth in claim 11, wherein the expansion joint further comprises in one of the housings, at least one section fixed to one of the two segments of conducting sections separated from each other, said section forming a protruding tongue extending through the segment of conducting section to which it is fixed and entering a slot of the concave side of the second conducting section, the width of the tongue and of the slot being smaller than the width of the friction piece, whereby any power gap in supplying this friction piece is avoided by said tongue.

13. The insulated power line as set forth in claim 1, wherein at the end, the last segment of conducting section is connected by a junction unit to a neutral segment of conducting section having an end which is embedded in a block of electrically insulating material maintained in the passage of the housing of said junction element.

14. The insulated power line as set forth in claim 1, wherein an electrically insulating block of a shape similar to that of the conducting sections is placed between two consecutive segments held by immobilization claws connected together by a small bar.

15. The insulated power line as set forth in claim 1, wherein the segments of conducting sections are formed by monometallic elements.

16. The insulated power line as set forth in claim 1, wherein the segments of conducting sections are formed by plurimetallic elements.

* * * * *